(12) United States Patent
Itoh

(10) Patent No.: US 9,661,180 B2
(45) Date of Patent: May 23, 2017

(54) IMAGE FORMING APPARATUS, IMAGE FORMING METHOD, AND COMPUTER-READABLE RECORDING MEDIUM

(71) Applicant: Takanori Itoh, Kanagawa (JP)

(72) Inventor: Takanori Itoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/153,843

(22) Filed: May 13, 2016

(65) Prior Publication Data

US 2016/0352966 A1 Dec. 1, 2016

(30) Foreign Application Priority Data

May 29, 2015 (JP) .................. 2015-109964

(51) Int. Cl.
*G06K 15/00* (2006.01)
*H04N 1/393* (2006.01)
*H04N 1/60* (2006.01)

(52) U.S. Cl.
CPC ........... *H04N 1/393* (2013.01); *H04N 1/6008* (2013.01); *H04N 2201/0094* (2013.01)

(58) Field of Classification Search
USPC ......................................................... 358/1.2
See application file for complete search history.

(56) References Cited

U.S. PATENT DOCUMENTS

| 2010/0196035 | A1* | 8/2010 | Takemura | .............. G03G 15/50 399/67 |
| 2010/0309496 | A1 | 12/2010 | Ido | |
| 2012/0063802 | A1 | 3/2012 | Suzuki et al. | |
| 2012/0177426 | A1* | 7/2012 | Fujita | ................ G03G 15/6585 399/341 |
| 2012/0189337 | A1* | 7/2012 | Takemura | .......... G03G 15/6585 399/67 |
| 2012/0237244 | A1* | 9/2012 | Yoshikawa | ........ G03G 15/6585 399/67 |
| 2013/0064588 | A1* | 3/2013 | Akita | ................ G03G 15/6585 399/341 |
| 2013/0258367 | A1* | 10/2013 | Saito | ..................... G06K 15/14 358/1.9 |
| 2013/0279958 | A1* | 10/2013 | Yukie | ................ G03G 15/6585 399/341 |
| 2016/0193858 | A1* | 7/2016 | Tsuchiya | ............. B29C 67/0059 347/16 |

FOREIGN PATENT DOCUMENTS

| JP | 2012-083736 | 4/2012 |
| JP | 5404192 | 11/2013 |

* cited by examiner

*Primary Examiner* — Jerome Grant, II
(74) *Attorney, Agent, or Firm* — Cooper & Dunham LLP

(57) ABSTRACT

An approach is provided for processing pattern data which corresponds to a type of visual effect that is obtained by applying a transparent material to a recording medium to which colored material is applied according to image data. Arrangement information indicating, for example, an area of the image data relative to the recording medium is employed when calculating a magnification to be applied to a size of the pattern data. Further, the image data is converted in accordance with the calculated magnification, and an image is formed on the recording medium by using the converted image data and the magnified (reduced or enlarged) pattern data.

5 Claims, 17 Drawing Sheets

FIG.5
MATTE 1
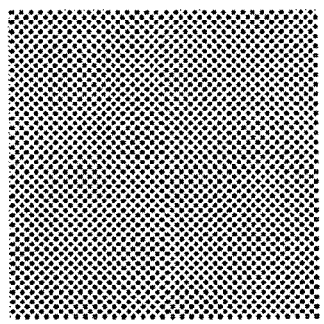
MATTE 2
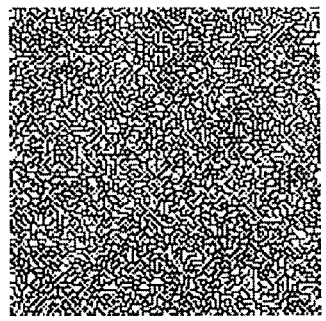
MATTE 3
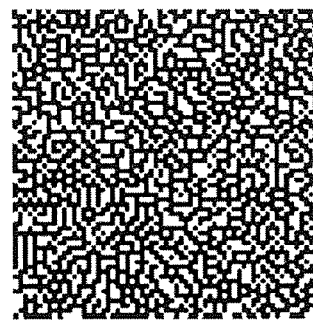
MATTE 4
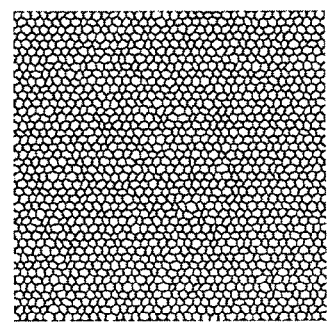

FIG. 7
EMBEDDED FIGURE 1a
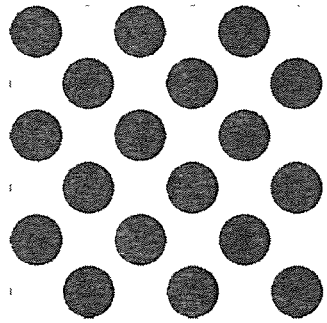
EMBEDDED FIGURE 2a
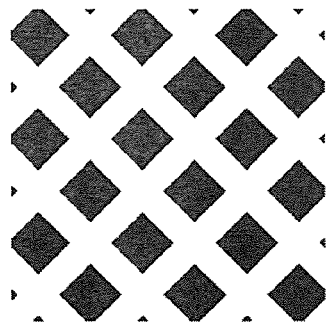
EMBEDDED FIGURE 3a
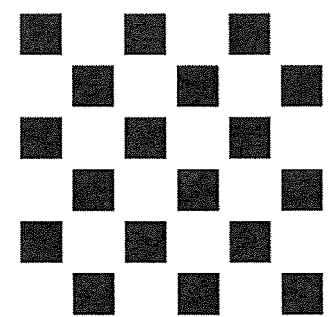
EMBEDDED FIGURE 4a
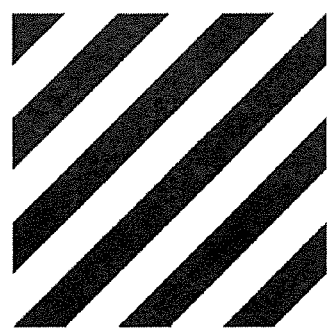

FIG.8
EMBEDDED FIGURE 1b
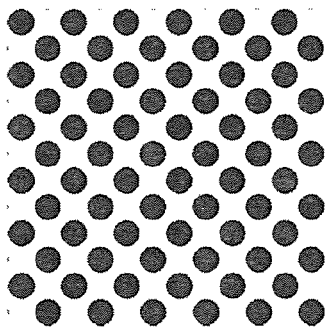
EMBEDDED FIGURE 2b
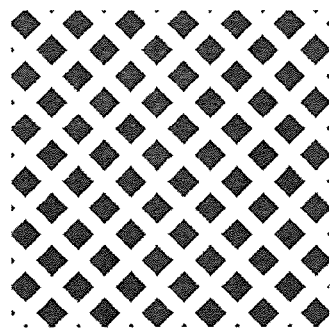
EMBEDDED FIGURE 3b
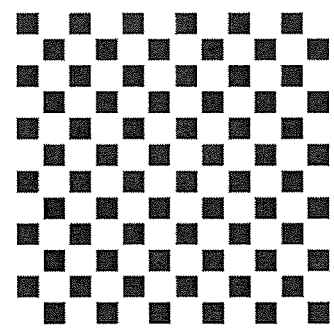
EMBEDDED FIGURE 4b
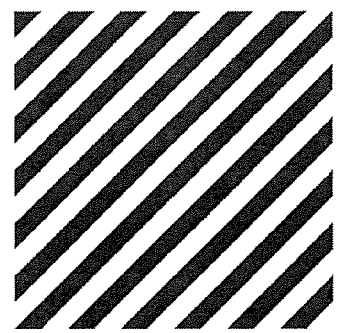

FIG.9
EMBEDDED FIGURE 1c
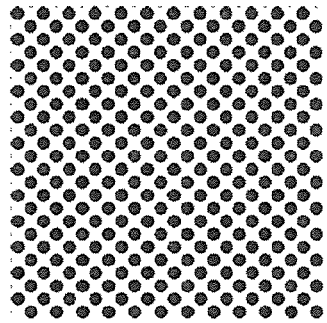
EMBEDDED FIGURE 2c
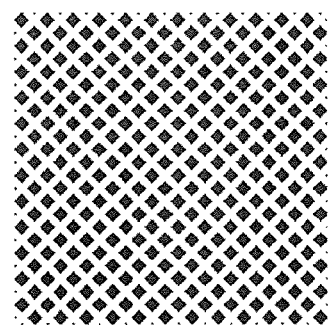
EMBEDDED FIGURE 3c
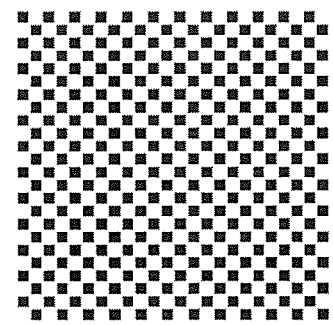
EMBEDDED FIGURE 4c
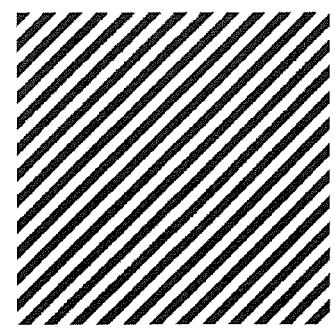

FIG.10

SELECTION INFORMATION

| VISUAL EFFECT | VISUAL EFFECT DATA [%] | MAGNIFICATION: 51% TO | MAGNIFICATION: 26% TO 50% | MAGNIFICATION: TO 25% |
|---|---|---|---|---|
| NONE | 0 | | 0 | |
| INVERSE MASK 1 | 1 TO 5 | | (EQUATION 1) | |
| INVERSE MASK 2 | 6 TO 10 | | (EQUATION 2) | |
| INVERSE MASK 3 | 11 TO 15 | | (EQUATION 3) | |
| INVERSE MASK 4 | 16 TO 20 | | (EQUATION 4) | |
| MATTE EFFECT 1 | 21 TO 25 | | MATTE 1 PATTERN OUTPUT | |
| MATTE EFFECT 2 | 26 TO 30 | | MATTE 2 PATTERN OUTPUT | |
| MATTE EFFECT 3 | 31 TO 35 | | MATTE 3 PATTERN OUTPUT | |
| MATTE EFFECT 4 | 36 TO 40 | | MATTE 4 PATTERN OUTPUT | |
| EMBEDDED FIGURE 1 | 41 TO 45 | EMBEDDED FIGURE 1a PATTERN OUTPUT | EMBEDDED FIGURE 1b PATTERN OUTPUT | EMBEDDED FIGURE 1c PATTERN OUTPUT |
| EMBEDDED FIGURE 2 | 46 TO 50 | EMBEDDED FIGURE 2a PATTERN OUTPUT | EMBEDDED FIGURE 2b PATTERN OUTPUT | EMBEDDED FIGURE 2c PATTERN OUTPUT |
| EMBEDDED FIGURE 3 | 51 TO 55 | EMBEDDED FIGURE 3a PATTERN OUTPUT | EMBEDDED FIGURE 3b PATTERN OUTPUT | EMBEDDED FIGURE 3c PATTERN OUTPUT |
| EMBEDDED FIGURE 4 | 56 TO 60 | EMBEDDED FIGURE 4a PATTERN OUTPUT | EMBEDDED FIGURE 4b PATTERN OUTPUT | EMBEDDED FIGURE 4c PATTERN OUTPUT |
| NONE (SPARE) | 71 TO 100 | | 0 | |

IMAGE FORMING APPARATUS, IMAGE FORMING METHOD, AND COMPUTER-READABLE RECORDING MEDIUM

CROSS-REFERENCE TO RELATED APPLICATION

The present application claims priority under 35 U.S.C. §119 to Japanese Patent Application No. 2015-109964 filed in Japan on May 29, 2015. The contents of which are incorporated herein by reference in their entirety.

BACKGROUND OF THE INVENTION

1. Field of the Invention

The present invention relates to an image forming apparatus, an image forming method, and a computer-readable recording medium.

2. Description of the Related Art

There are conventionally-known image forming apparatuses that form images on a recording medium, such as sheet, by using colorless and transparent toner in addition to colored toner of CMYK, or the like. Furthermore, in order to utilize the above-described image forming apparatuses, there is a known technology for achieving visual surface effects by attaching control data to document data, such as "control code for providing predetermined glossy texture to the surface of an image although it is hard to be recognized as a pattern" or "control code for specifying a pattern that may be definitely recognized as a pattern".

For example, there is a disclosed printing control device that applies a visual effect to a recording medium (see Japanese Patent Application Laid-open No. 2012-083736). Japanese Patent Application Laid-open No. 2012-083736 discloses the configuration of the printing control device that processes the gloss-control plate data that specifies the gloss control value for determining the type of surface effect to be applied and its area on the recording medium on a pixel by pixel basis.

However, according to the above-described conventional technology for applying visual surface effects, the control code, processed by a raster image processor (RIP), is replaced with a pattern. Therefore, if images are recorded after the document data is reduced in size, e.g., images are combined before they are formed on a recording medium, the pattern of the transparent toner is used without being reduced in size; therefore, there is a problem in that it is difficult to achieve the desired visual surface effect.

In view of the conventional problem, there is a need to provide an image forming apparatus, an image forming method, and a computer-readable recording medium having a computer program that make it possible to achieve the desired visual surface effect even in a case where an image is recorded on a recording medium after the document data is reduced or enlarged in size.

SUMMARY OF THE INVENTION

It is an object of the present invention to at least partially solve the problems in the conventional technology.

According to exemplary embodiments of the present invention, there is provided an image forming apparatus comprising: a storage unit that stores pattern data on a transparent material, which corresponds to a type of visual effect that is applied to a recording medium by using the transparent material; a receiving unit that receives image data that is output to the recording medium by using colored material, additional data that indicates the type of visual effect, and arrangement information, including information that indicates an area of the image data relative to the recording medium; an arrangement-information processing unit that refers to the arrangement information to calculate a magnification for output of the image data; a selecting unit that selects the pattern data that corresponds to the type of visual effect, indicated by the additional data, from the storage unit; a magnification-change processing unit that reduces or enlarges a size of the selected pattern data in accordance with the calculated magnification; a first converting unit that converts the image data in accordance with the calculated magnification; and an image forming unit that forms an image on the recording medium by using the converted image data and the reduced-size or enlarged-size pattern data.

Exemplary embodiments of the present invention also provide an image forming method that is implemented by an image forming apparatus, the image forming apparatus including a storage unit that stores pattern data on a transparent material, which corresponds to a type of visual effect, applied to a recording medium by using the transparent material, and a magnification for output of image data that is output to the recording medium by using colored material, the image forming method comprising: receiving the image data, additional data that indicates the type of visual effect, and arrangement information, including information that indicates an area of the image data relative to the recording medium; referring to the arrangement information to calculate a magnification for output of the image data; selecting the pattern data that corresponds to the type of visual effect, indicated by the additional data, and the calculated magnification from the storage unit; converting the image data in accordance with the calculated magnification; and forming an image on the recording medium by using the converted image data and the selected pattern data.

Exemplary embodiments of the present invention also provide a non-transitory computer-readable medium having computer readable program codes, performed by a computer, including a storage unit that stores pattern data on a transparent material, which corresponds to a type of visual effect, applied to a recording medium by using the transparent material, and a magnification for output of image data that is output to the recording medium by using colored material, the program codes when executed causing the computer to execute: receiving the image data, additional data that indicates the type of visual effect, and arrangement information, including information that indicates an area of the image data relative to the recording medium; referring to the arrangement information to calculate a magnification for output of the image data; selecting the pattern data that corresponds to the type of visual effect, indicated by the additional data, and the calculated magnification from the storage unit; converting the image data in accordance with the calculated magnification; and forming an image on the recording medium by using the converted image data and the selected pattern data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram that illustrates examples of the matte-effect pattern data that is stored in the first-pattern storage unit according to the first embodiment;

FIG. 7 is a diagram that illustrates examples of the embedded-figure pattern data, stored in the second-pattern storage unit according to the first embodiment;

FIG. 8 is a diagram that illustrates other examples of the embedded-figure pattern data, stored in the second-pattern storage unit according to the first embodiment;

FIG. 9 is a diagram that illustrates other examples of the embedded-figure pattern data, stored in the second-pattern storage unit according to the first embodiment;

FIG. 10 is a diagram that illustrates an example of the selection information, stored in a selection-information storage unit according to the first embodiment;

DETAILED DESCRIPTION OF THE PREFERRED EMBODIMENTS

With reference to the attached drawings, a detailed explanation is given below of embodiments of an image forming apparatus, an image forming method, and a computer-readable recording medium having a computer program.

First Embodiment

Figure 1:
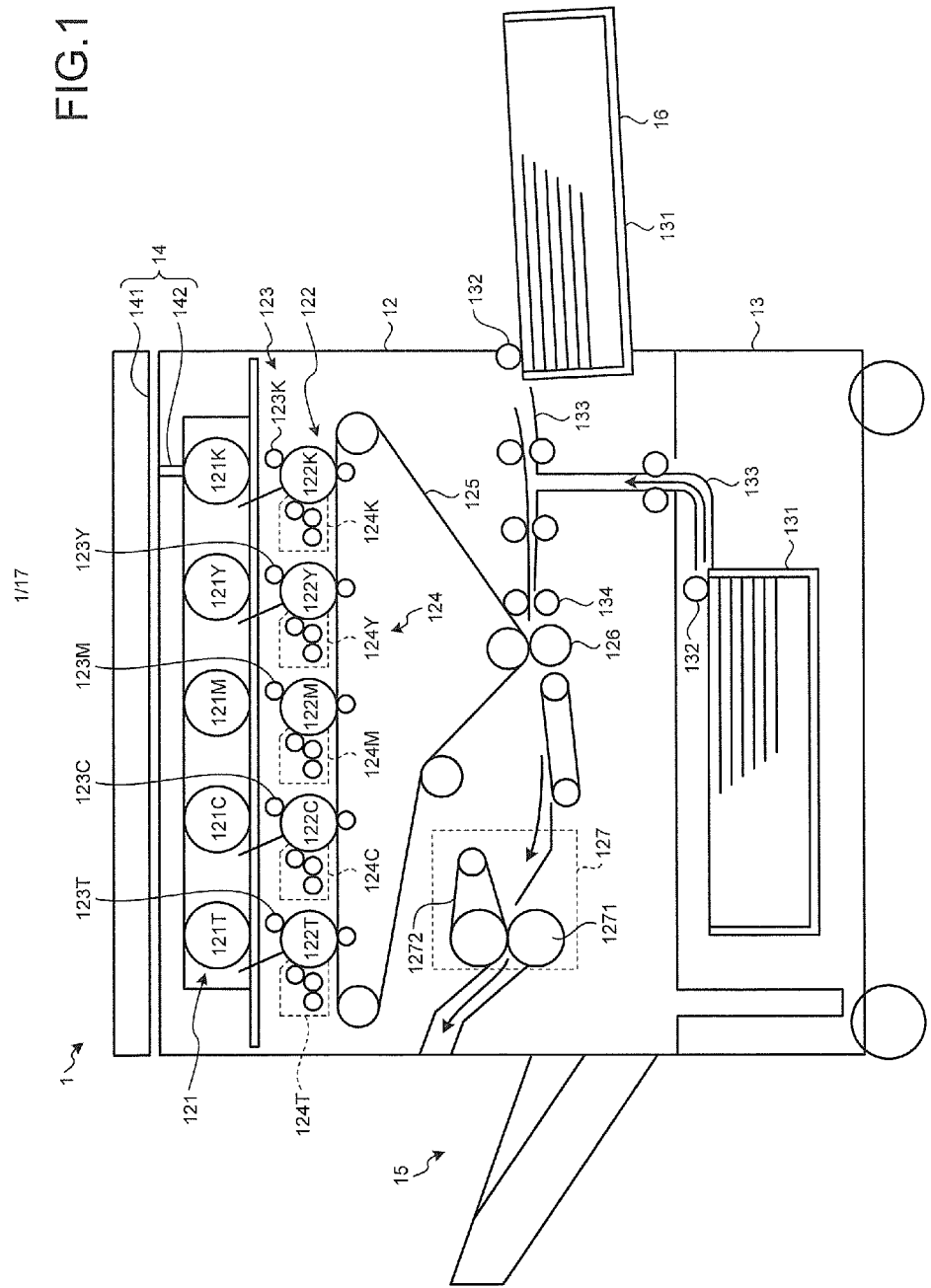
FIG. 1 is a hardware configuration diagram of an image forming apparatus according to a first embodiment of the present invention.

First, an explanation is given of a hardware configuration of an image forming apparatus 1. FIG. 1 is a hardware configuration diagram of the image forming apparatus according to a first embodiment of the present invention.

Figure 2:
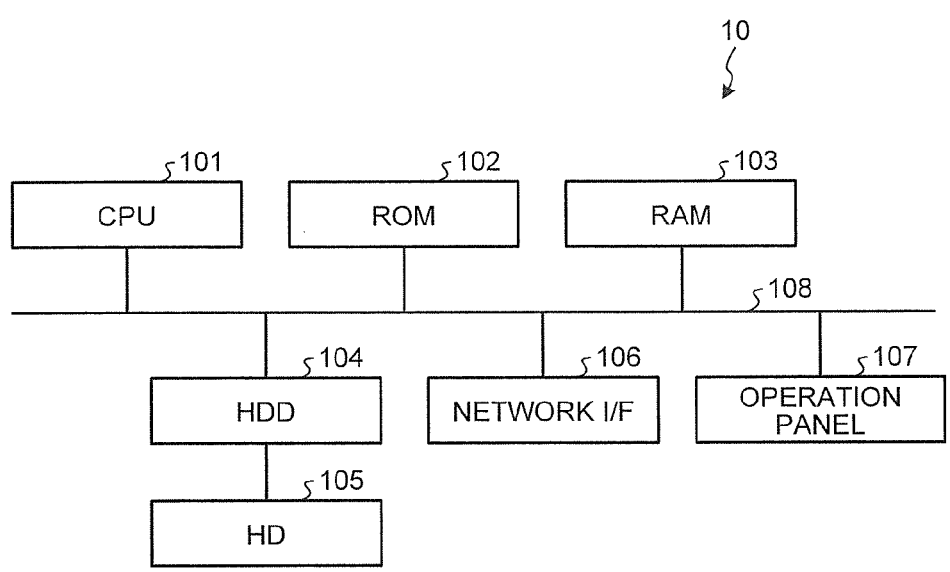
FIG. 2 is a hardware configuration diagram of a control unit of the image forming apparatus according to the first embodiment.

FIG. 2 is a hardware configuration diagram of a control unit of the image forming apparatus according to the first embodiment.

As illustrated in FIG. 1, the image forming apparatus 1 according to the present embodiment includes a printer unit 12, a sheet feeding unit 13, a scanner unit 14, a paper ejection unit 15, a sheet feeding unit 16, and a control unit 10 (see FIG. 2).

First, the control unit 10, illustrated in FIG. 2, is explained. The control unit 10 includes a central processing unit (CPU) 101, a read only memory (ROM) 102, a random access memory (RAM) 103, a hard disk drive (HDD) 104, a hard disk (HD) 105, a network interface (I/F) 106, an operation panel 107, and a bus line 108.

The CPU 101 controls the image forming apparatus 1, and it executes an image formation program to form images. The ROM 102 stores the information on a system activation program, or the like. The RAM 103 is used a work area, in which the CPU 101 executes programs.

The HDD 104 controls reading or writing of various types of data from or to the HD 105. The HD 105 is a storage device that stores data, and it may be replaced with an external storage device, such as a Compact Disc Read-Only Memory (CD-ROM), Compact Disc-Recordable (CD-R), or Digital Versatile Disk (DVD).

The network I/F 106 transmits and receives various types of information with an external device, such as an information processing apparatus. The operation panel 107 receives operation inputs from users. Furthermore, the bus line 108 connects the above-described units.

A configuration may be such that a program, stored in the ROM 102, is provided by being recorded, in the form of a file that is installable or executable, in a non-transitory computer-readable recording medium, such as a CD-ROM, CD-R, or DVD.

With reference back to FIG. 1, the hardware configuration of the printer unit 12 is first explained. The printer unit 12 includes a cartridge 121, a photoconductor drum 122, a charging unit 123, a developing unit 124, an intermediate transfer belt 125, a secondary transfer roller 126, and a fixing unit 127.

The cartridge 121 contains colored toner in cyan (C) color, magenta (M) color, yellow (Y) color, and black (K) color and clear toner, which is clear (T) transparent toner, and it includes five cartridges 121C, 121M, 121Y, 121K, and 121T, which correspond to the types of toner.

Here, the colored toner is equivalent to a colored material, and the clear toner (transparent toner) is equivalent to a transparent material. Furthermore, if any of the cartridges 121C, 121M, 121Y, 121K, and 121T is indicated below, it is sometimes simply referred to as the "cartridge 121".

The clear toner, used according to the present embodiment, is colorless and transparent toner, and it is the toner that is formed from resin that does not include colorant. Furthermore, the clear toner appropriately covers the front surface of a recording medium, such as sheet, so as to make smooth the front surface of the recording medium and provide it with gloss or form deliberate concavity and convexity on the front surface of the recording medium and provide matte effect, thereby making visual effects, which are visual surface effects.

The front surface of the photoconductor drum 122 is uniformly charged by the charging unit 123, and an electrostatic latent image is formed on the front surface based on the image data that is received from the control unit 10. Furthermore, the developing unit 124 causes toner to adhere to the front surface, on which the electrostatic latent image has been formed, whereby an image is formed on the photoconductor drum 122.

The photoconductor drum 122 includes five photoconductor drums 122C, 122M, 122Y, 122K, and 122T, which correspond to the types of toner in C color, M color, Y color, K color, and T color. Furthermore, if any of the photoconductor drums 122C, 122M, 122Y, 122K, and 122T is indicated below, it is sometimes simply referred to as the "photoconductor drum 122".

The charging unit 123 is brought into contact with the photoconductor drum 122 to apply the voltage, thereby charging the front surface of the photoconductor drum 122. The charging unit 123 includes five charging units 123C, 123M, 123Y, 123K, and 123T, which correspond to the types of toner in C color, M color, Y color, K color, and T color. Furthermore, if any of the charging units 123C, 123M, 123Y, 123K, and 123T is indicated below, it is sometimes simply referred to as the "charging unit 123".

The charged front surface of the photoconductor drum 122 is irradiated with laser scanning light that is biased based on the colored-material amount data (colored-material amount information), which is converted by a colored-material amount converting unit 223 (see FIG. 3), and the transparent-material amount data (transparent-material amount information), which is converted by a transparent-material amount converting unit 226 (see FIG. 3), whereby an electrostatic latent image is formed.

The developing unit 124 causes toner in the cartridge 121 to adhere to the electrostatic latent image, formed on each of the photoconductor drums 122, so that the image is formed on the front surface of the photoconductor drum 122. The developing unit 124 includes five developing units 124C, 124M, 124Y, 124K, and 124T, which correspond to the types of toner in C color, M color, Y color, K color, and T color. Furthermore, if any of the developing units 124C, 124M, 124Y, 124K, and 124T is indicated below, it is sometimes simply referred to as the "developing unit 124".

The intermediate transfer belt 125 is conveyed while it is in contact with the photoconductor drum 122, whereby the image is transferred onto the front surface thereof.

The secondary transfer roller 126 nips the recording medium, conveyed from the sheet feeding unit 13 that is described later, in the gap with the intermediate transfer belt 125 so that the image, formed when the toner adheres to the intermediate transfer belt 125, is transferred onto the recording medium, and the recording medium with the image formed thereon is conveyed to the fixing unit 127.

The fixing unit 127 fixes the image to the recording medium, delivered from the secondary transfer roller 126, and it includes a pressing roller 1271, a fixing belt 1272, or the like.

The pressing roller 1271 pushes the recording medium against the fixing belt 1272 and applies heat, thereby fixing the image, formed when the toner adheres to the recording medium. The fixing belt 1272 has the recording medium pushed against the pressing roller 1271, thereby fixing the image to the recording medium.

Next, an explanation is given of hardware configurations of the sheet feeding unit 13 and the sheet feeding unit 16. The sheet feeding unit 13 and the sheet feeding unit 16 feed a recording medium, such as sheet, to the printer unit 12, and each of them includes a sheet feeding tray 131, a sheet feeding roller 132, a sheet feeding belt 133, and a registration roller 134.

The sheet feeding tray 131 contains a recording medium such as sheet. The sheet feeding roller 132 pulls out a sheet, contained in the sheet feeding tray 131, and places it on the sheet feeding belt 133. The sheet feeding belt 133 conveys the sheet to insert it to the registration roller 134. Furthermore, any one of the sheet feeding unit 13 and the sheet feeding unit 16 is selected when an image is formed. The registration roller 134 delivers the sheet into the gap between the intermediate transfer belt 125 and the secondary transfer roller 126.

Next, an explanation is given of hardware configurations of the scanner unit 14 and the paper ejection unit 15. The scanner unit 14 reads image information that is described on a sheet, or the like, and it includes an exposure glass 141 and a read sensor 142. On the exposure glass 141, a sheet that describes an image is placed. The read sensor 142 reads the image information that is described on the sheet, placed on the exposure glass 141.

The paper ejection unit 15 ejects the recording medium, to which the image has been fixed by the fixing unit 127, and it stores the ejected recording medium.

Figure 3:
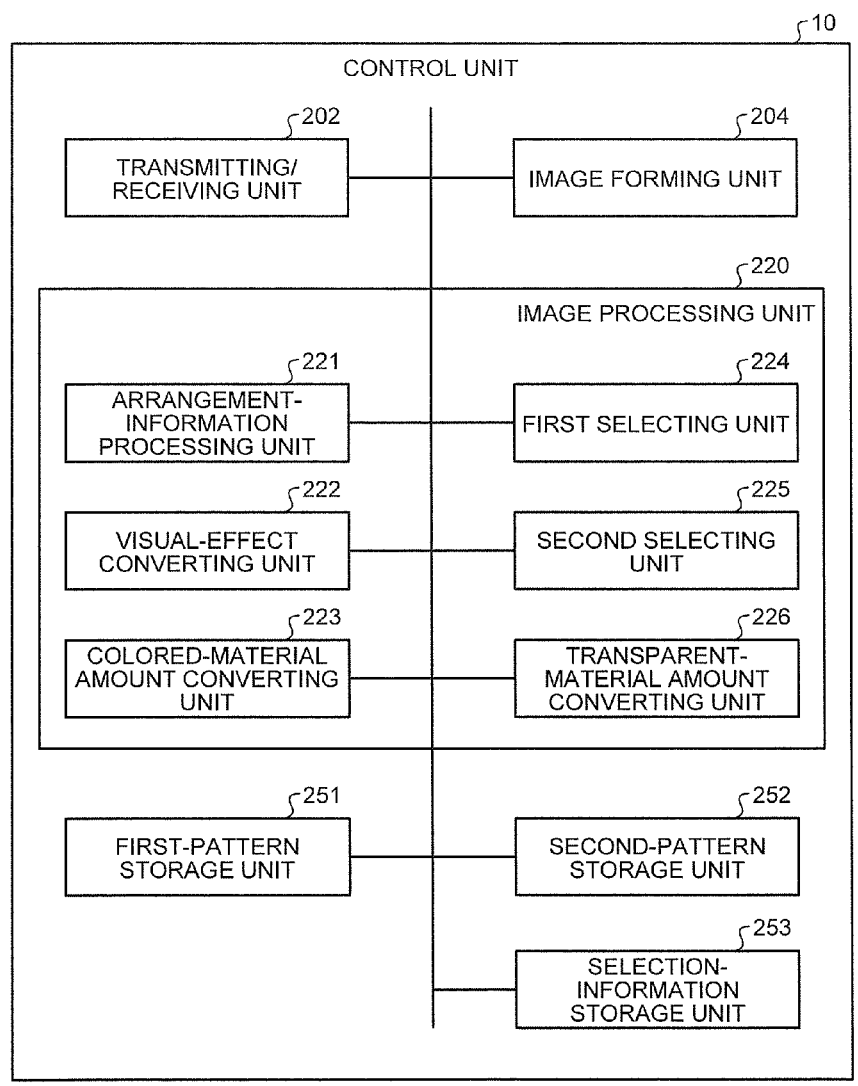
FIG. 3 is a block diagram that illustrates a functional configuration of the control unit according to the first embodiment.

Next, an explanation is given of a functional configuration of the control unit 10 of the image forming apparatus 1. FIG. 3 is a block diagram that illustrates the functional configuration of the control unit according to the first embodiment. As illustrated in FIG. 3, the control unit 10 includes a transmitting/receiving unit 202, an image processing unit 220, an image forming unit 204, a first-pattern storage unit 251, a second-pattern storage unit 252, and a selection-information storage unit 253. Each of the units is the function that is implemented when any of the components, illustrated in FIG. 2, is operated in response to a command from the CPU 101 in accordance with the program, stored in the ROM 102.

The transmitting/receiving unit 202 is implemented by the network I/F 106, illustrated in FIG. 2, and it transmits and receives data to and from an information processing apparatus, such as a personal computer (PC). According to the present embodiment, the transmitting/receiving unit 202 receives image data, additional data, and arrangement information, transmitted from a PC, or the like.

Here, the image data is the data that is printed (output) to a recording medium, such as sheet, by using colored toner, i.e., the data that represents an image to be formed on a recording medium by using colored toner, and it is bitmap-format or vector-format data, represented by using a color format, such as RGB or CMYK, or a monochrome/grayscale format.

Furthermore, the additional data is the data that indicates the type of visual effect that is applied to a recording medium, such as sheet, by using clear toner, i.e., the bitmap-format or vector-format data that represents the type of visual effect that is applied when clear toner is attached to a recording medium, such as sheet, by using a monochrome grayscale format. Furthermore, the additional data may specify the type of visual effect, applied to a recording medium, on a pixel by pixel basis.

Furthermore, the arrangement information is the information that indicates the size or position of the visual effect, indicated by the image data and the additional data, relative to a recording medium. Specifically, the arrangement information is the information that indicates whether the visual effect, indicated by the image data and the additional data, is recorded on a recording medium by using the unchanged position/size, or how the position or size is changed for recording, and it is the information based on the settings for enlargement/reduction in the printing settings, the settings for imposition, or the like.

The image processing unit 220 conducts image processing on the image data, the additional data, or the like, received by the transmitting/receiving unit 202, so as to convert the data into the recording amount of the colored toner and the recording amount of the clear toner, included in the image forming unit 204. The details are given later.

The image forming unit 204 forms (prints) an image on a recording medium based on the recording amount of the colored toner and the recording amount of the clear toner, converted by the image processing unit 220.

Here, an explanation is given of an inverse mask, matte effect, and embedded figure, which are examples of the visual effect. The inverse mask is used to uniform the total adherence amount of the CMYK colored toner and the clear toner together in each of the pixels that constitute the target area, to which the visual effect is applied. Specifically, all the recording amounts that are indicated by a pixel, included in the target area, in the CMYK plate image data are added, and the added value is subtracted from a predetermined value to obtain the image data, which becomes an inverse mask. Here, the clear toner is described as "Clr" in the following Equations (1) to (4).

For example, the inverse mask is represented by the following Equation (1).

$$Clr=100-(C+M+Y+K) \text{ where, if } Clr<0, Clr=0 \quad (1)$$

In Equation (1), Clr, C, M, Y, and K represent the area rates that are converted from the recording amounts of each pixel with regard to the clear toner and the C, M, Y, and K toner.

That is, with Equation (1), the total area rate, which is the addition of the area rate of the clear toner to the area rates of the colored toner of C, M, Y, and K, is 100% with regard to all the pixels that are included in the target area, to which the visual effect is applied. Furthermore, if the total area rate of the colored toner of C, M, Y, and K is equal to or more than 100%, the clear toner is not applied and its area rate is set to 0%. This is because the area, of which the total area rate of the colored toner of C, M, Y, and K exceeds 100%, is smoothed during a fixing operation.

As described above, as the total area rate of every pixel, included in the target area to which the visual effect is applied, is equal to or more than 100%, unevenness on the front surface due to the difference in the total toner adherence amount in the target area is eliminated, and as a result, gloss is generated due to light regular reflection. Furthermore, some inverse masks may be obtained by using other than Equation (1), and there may be multiple types of inverse masks.

For example, the inverse mask may be used to uniformly attach the clear toner to each pixel. In this case, the inverse mask is also referred to as a solid mask, and it is represented by the following Equation (2).

$$Clr=100 \quad (2)$$

Furthermore, some of the target pixels, to which the visual effect is applied, may be related to the area rate other than 100%, and there may be multiple patterns of solid masks.

Furthermore, for example, the inverse mask may be obtained by multiplying the blank-surface area rates of the colors. In this case, the inverse mask is represented by, for example, the following Equation (3).

$$Clr=100 \times \{(100-C)/100\} \times \{(100-M)/100\} \times \{(100-Y)/100\} \times \{(100-K)/100\} \quad (3)$$

In Equation (3), (100-C)/100 represents the blank-surface exposure rate of C, (100-M)/100 represents the blank-surface exposure rate of M, (100-Y)/100 represents the blank-surface exposure rate of Y, and (100-K)/100 represents the blank-surface exposure rate of K.

Furthermore, in Equation (1), the total adherence amount, which is the addition of the adherence amount of the clear toner to the total adherence amounts of the colored toner of C, M, Y, and K, is approximated to 100% with regard to all the pixels that are included in the target area, to which the visual effect is applied; however, this is not a limitation, and it may be approximated to, for example, 150%. In this case, the inverse mask is represented by, for example, the following Equation (4).

$$Clr=150-(C+M+Y+K) \text{ where, if } Clr<0, Clr=0, \text{ and if } Clr>100, Clr=100 \quad (4)$$

That is, the inverse mask may be represented by any one of the above-described Equation (1) to Equation (4).

Next, an explanation is given of the matte effect, which is one of the visual effects. The matte effect is to intentionally disturb the reflection on the front surface of the image by providing concavity and convexity using the clear toner, thereby reducing the gloss effect. Here, in order to effectively reduce the gloss effect, the interval of the concavity and convexity, applied by using the clear toner, may fall within a certain range. Specifically, if the interval of the concavity and convexity is too large, the concavity and convexity are recognized as a pattern, and they are not perceived as a reduction in the gloss effect. Conversely, if the interval of the concavity and convexity is too small, the concavity and convexity effect is decreased. This is because halftone dots or line pattern of 150 to 300 lines are applied to the C, M, Y, and K toner and therefore the concavity and convexity using the clear toner get buried as they become close to the interval. About 25 to 100 lines are suitable for the interval of the concavity and convexity using the clear toner to reduce the gloss effect.

Next, an explanation is given of the embedded figure, which is one of the visual effects. Contrary to the matte effect, the embedded figure is applied by using the clear toner so as to be recognized as a pattern. Here, as the clear toner is hard to see by its nature, small-sized patterns are not practical. Therefore, in order to facilitate perception, an interval pattern of equal to or less than 10 lines is preferred.

The above-described concavity and convexity of the clear toner for the matte effect and the embedded figure may be stored as pattern data. Furthermore, the corresponding pattern data is fetched based on the value of the visual effect data, indicating the type of visual effect, and it is converted into the transparent-material amount data that indicates the recording amount of the clear toner.

Here, if the matte-effect pattern data is not output with the unchanged size of the pattern that is stored in the image forming apparatus 1, it is difficult to obtain the intended visual effect. Therefore, even if an arrangement-information processing unit 221, described later, calculates the shift amount or the magnification of the image data, it is preferable that the matte-effect pattern data is directly converted into the transparent-material amount data.

Conversely, as the embedded-figure pattern data is selected in accordance with the size of the image data, it is preferable that the size of the embedded-figure pattern data is changed in accordance with the shift amount or the magnification of the image data, calculated by the arrangement-information processing unit 221 that is described later, and the embedded-figure pattern data is converted into the transparent-material amount data.

With reference back to FIG. 3, the first-pattern storage unit 251 is implemented by the HDD 104, or the like, and it stores one or more sets of matte-effect pattern data (matte pattern), which is clear-toner pattern data, corresponding to the types of visual effects that are applied to a recording medium by using the clear toner. Furthermore, the pattern data that corresponds to the visual effect, selected by a first selecting unit 224 that is described later, is output to a recording medium.

Figure 4:
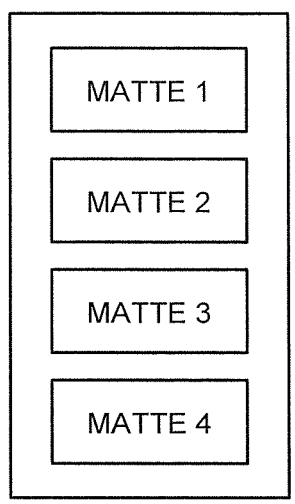
FIG. 4 is an explanatory diagram of a first-pattern storage unit, included in the image forming apparatus according to the first embodiment.

FIG. 4 is an explanatory diagram of the first-pattern storage unit, included in the image forming apparatus according to the first embodiment. Furthermore, FIG. 5 is a diagram that illustrates examples of the matte-effect pattern data that is stored in the first-pattern storage unit according to the first embodiment. According to the present embodiment, as illustrated in FIGS. 4 and 5, the first-pattern storage unit 251 stores the matte-effect pattern data on matte 1 to 4.

The second-pattern storage unit 252 is implemented by the HDD 104, or the like, and it stores one or more sets of clear-toner embedded-figure pattern data (embedded figure pattern) that is related to the type of visual effect and the magnification for output of the image data that is to be output to a recording medium by using the colored toner. Furthermore, the pattern data that corresponds to the visual effect, selected by the first selecting unit 224 that is described later, and the magnification, calculated by the arrangement-information processing unit 221, is output to the recording medium.

Figure 6:
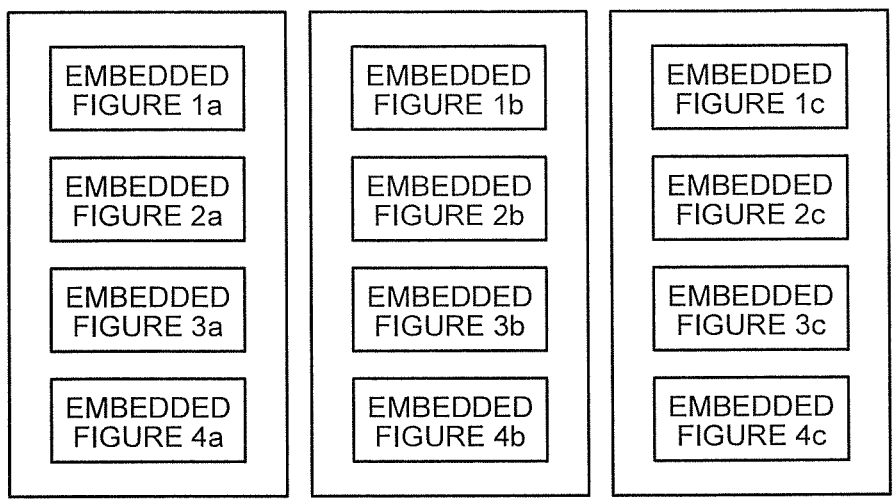
FIG. 6 is an explanatory diagram of a second-pattern storage unit, included in the image forming apparatus according to the first embodiment.

FIG. 6 is an explanatory diagram of the second-pattern storage unit, included in the image forming apparatus according to the first embodiment. Furthermore, FIG. 7 is a diagram that illustrates examples of the embedded-figure pattern data, stored in the second-pattern storage unit according to the first embodiment. FIG. 8 is a diagram that illustrates other examples of the embedded-figure pattern data, stored in the second-pattern storage unit according to the first embodiment. FIG. 9 is a diagram that illustrates other examples of the embedded-figure pattern data, stored in the second-pattern storage unit according to the first embodiment.

As illustrated in FIG. 6, according to the present embodiment, the second-pattern storage unit 252 stores 12 types of embedded-figure pattern data on embedded figures 1a to 4a, 1b to 4b, and 1c to 4c. Furthermore, as illustrated in FIGS. 7 to 9, the embedded-figure pattern data is stored for each magnification, that is, the pattern data with the size reduced from the embedded figures 1a to 4a is the embedded figures 1b to 4b, and the pattern data with the size further reduced is the embedded figures 1c to 4c. Then, any pattern data, related to the selected visual effect (the embedded FIGS. 1 to 4) and magnification, is selected and is output to a recording medium.

The selection-information storage unit 253 is implemented by the HDD 104, or the like, and it stores the selection information that is referred to by the first selecting unit 224 and a second selecting unit 225 during selection of the pattern data. FIG. 10 is a diagram that illustrates an example of the selection information, stored in the selection-information storage unit according to the first embodiment. An inverse mask, matte effect, and embedded figure, which are the above-described visual effects, the visual effect data, and the magnification are related in the selection information, illustrated in FIG. 10. In the selection information of FIG. 10, a visual effect is basically assigned to the visual effect data at 5% intervals.

Specifically, if the visual effect data=0, it indicates the area where the clear toner is not applied. Furthermore, if the visual effect data=1 to 5, 6 to 10, 11 to 15, and 16 to 20, an inverse mask operation is assigned, and an operation is performed with the above-described Equation (1) to Equation (4). Furthermore, if the visual effect data=21 to 25, 26 to 30, 31 to 35, and 36 to 40, a matte-effect operation is assigned, and the pattern data on the above-described matte 1 to matte 4 is output. Here, if the visual effect data=0 to 40, the same operation is performed regardless of the magnification.

Furthermore, if the visual effect data=41 to 45, 46 to 50, 51 to 55, and 56 to 60, an embedded-figure operation is assigned, and embedded-figure pattern data is output in accordance with the value of the visual effect data and the magnification. That is, in the case of the embedded-figure pattern data that may be recognized as a pattern, the pattern data is changed in accordance with the magnification, as in FIGS. 7 to 9; therefore, it is possible to obtain the desired visual effect even in the case of reduction in size, such as combining, of image data.

According to the present embodiment, the visual effect data is obtained by converting the additional data into the bitmap that matches the resolution of the image forming unit 204. In the visual effect data (the additional data), by using the format of the print information on the clear toner, which is special color ink, the type of visual effect is assigned to the range of the halftone-dot area rates (0 to 100%). The application software, which is capable of handling the special color ink, supports the mechanism for specifying the grayscale of the special color ink by using the halftone-dot area rate. The present embodiment uses "%" as it uses the operation technique for specifying the type of visual effect with the halftone-dot area rate using the application software. Furthermore, the configuration may be made by using a different method, as long as the visual effect data is related to the visual effect and the magnification.

Next, an explanation is given of the details of the image processing unit 220. The image processing unit 220 further includes the arrangement-information processing unit 221, a visual-effect converting unit 222, the colored-material amount converting unit 223, the first selecting unit 224, the second selecting unit 225, and the transparent-material amount converting unit 226.

The arrangement-information processing unit 221 refers to the arrangement information, received from the transmitting/receiving unit 202, to calculate the shift amount and the magnification for printing (outputting) the visual effect, indicated by the received image data and additional data. Specifically, on the basis of the arrangement information, the arrangement-information processing unit 221 calculates the shift amount and the magnification as to whether the visual effect, indicated by the image data and the additional data, is recorded by using the unchanged position/size, how the position or the size is changed, or the like. Then, the arrangement-information processing unit 221 notifies the colored-material amount converting unit 223 and the visual-effect converting unit 222 of the calculated shift amount and magnification.

Figure 11:
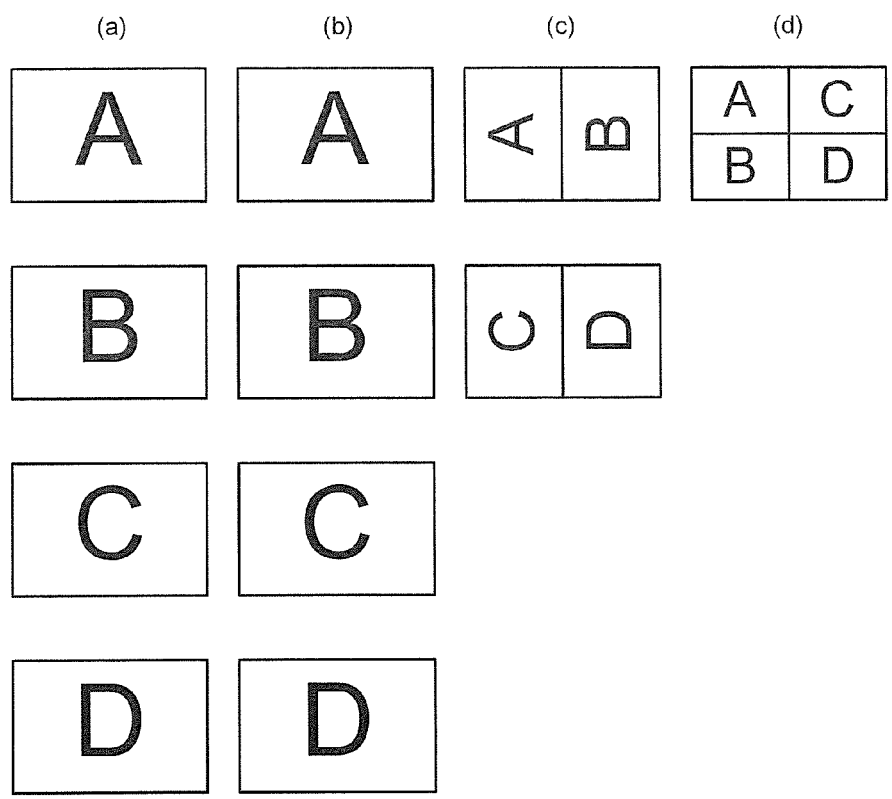
FIG. 11 is an explanatory diagram of the print size of image data by the image forming apparatus according to the first embodiment.

FIG. 11 is an explanatory diagram of the print size of image data by the image forming apparatus according to the first embodiment. As illustrated in a section (a) of FIG. 11, for example, there are A4-sized documents that contain 4 pages. The documents are generated by an information processing apparatus, such as a PC. Furthermore, if the documents are to be printed, the print specification is usually made such that they are printed on A4-sized sheets in 4 pages, as illustrated in a section (b) of FIG. 11.

Figure 12:
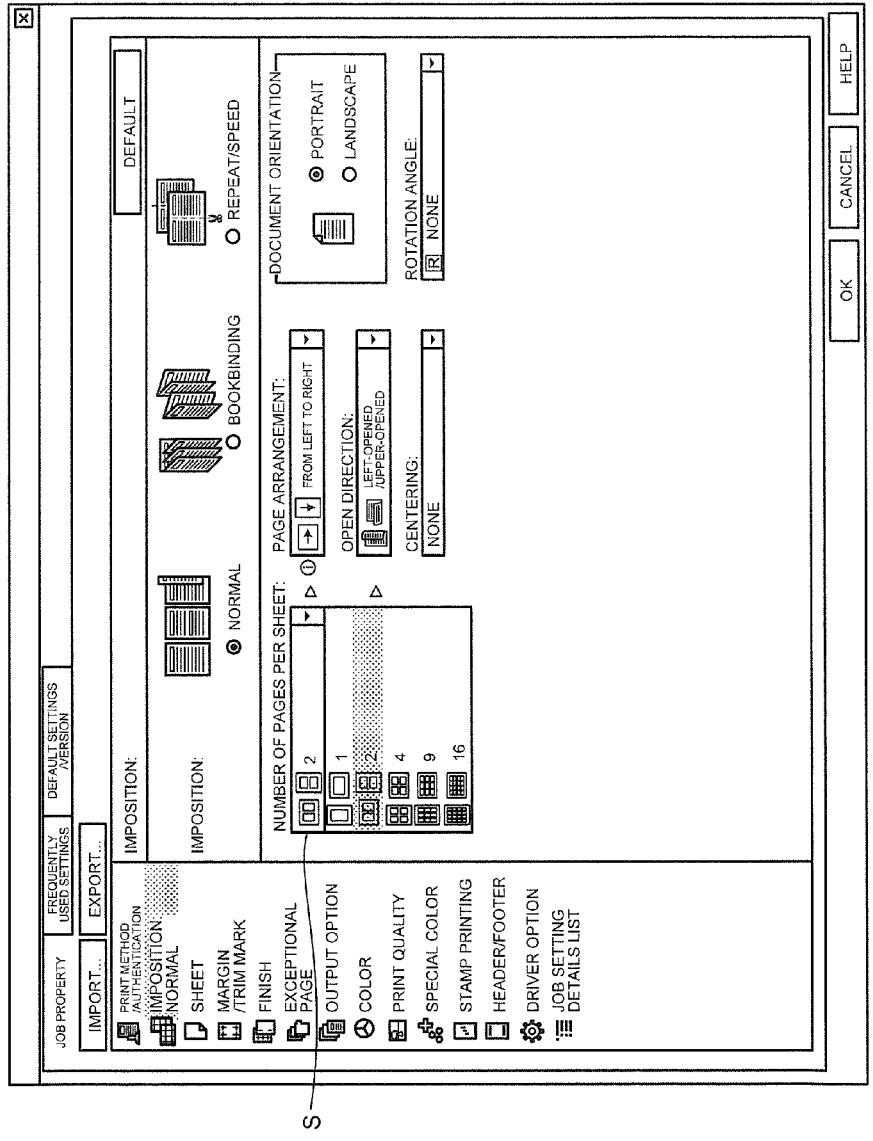
FIG. 12 is a diagram that illustrates an example of the setting screen that is displayed on a PC.

However, depending on a user's purpose, there may be a case where the print specification is made such that the two pages are printed on each of the two pages of A4-sized sheets, as illustrated in a section (c) of FIG. 11, or a case where the print specification is made such that the four pages are printed on one page, as illustrated in a section (d) of FIG. 11. Therefore, the arrangement-information processing unit 221 calculates the shift amount and the magnification in accordance with the print specification and notifies them to the colored-material amount converting unit 223, the visual-effect converting unit 222, or the like, so as to cause them to process the image data and the additional data. FIG. 12 is a diagram that illustrates an example of the setting screen that is displayed on the PC. The print specification is received through a setting item S on the setting screen, illustrated in FIG. 12, and it is transmitted to the image forming apparatus 1.

The visual-effect converting unit 222 converts the additional data, received by the transmitting/receiving unit 202, into the bitmap-format visual effect data that indicates the type of visual effect. Specifically, in response to a command from the arrangement-information processing unit 221, the visual-effect converting unit 222 develops vector-format additional data into bitmap-format data or converts bitmap-format additional data into bitmap-format data that matches the resolution of the image forming unit 204.

The colored-material amount converting unit 223 converts the image data, received by the transmitting/receiving unit 202, into the colored-material amount data (the colored-material amount information), indicating the recording amount of the colored toner included in the image forming unit 204, in accordance with the magnification for output of the image data, calculated by the arrangement-information processing unit 221. According to the present embodiment, the colored-material amount converting unit 223 converts image data into bitmap-format colored-material amount data that indicates the recording amount of the colored toner, included in the image forming unit 204. Here, the colored-material amount converting unit is corresponding to the first converting unit in Claims.

Specifically, the colored-material amount converting unit 223 converts the received image data in accordance with the shift amount or the magnification, calculated by the arrangement-information processing unit 221, e.g., develops vector-format image data into bitmap-format data, or converts bitmap-format image data into bitmap-format data that matches the resolution of the image forming unit 204. Furthermore, the colored-material amount converting unit 223 converts the color of an image, represented by using the RGB color format, into the colored-material amount data on CMYK, or the like, which is included in the image forming unit 204 and is reproduced by the image forming unit 204. Furthermore, the colored-material amount converting unit 223 converts the color of an image, represented by using the CMYK color format for a different image forming unit, into the colored-material amount data on CMYK, or the like, which is included in the image forming unit 204 and is reproduced by the image forming unit 204.

The first selecting unit 224 refers to the selection information, stored in the selection-information storage unit 253, to select the pattern data that corresponds to the type of visual effect, indicated by the additional data, from the first-pattern storage unit 251 or the second-pattern storage unit 252. Specifically, when the first selecting unit 224 refers to the selection information of FIG. 10, it selects, from the first-pattern storage unit 251 or the second-pattern storage unit 252, the visual-effect pattern data that corresponds to the value (%) of the visual effect data, to which the additional data has been converted.

Specifically, if the visual effect data is 1 to 20%, the first selecting unit 224 selects the corresponding inverse masks 1 to 4, and the transparent-material amount converting unit 226, described later, performs operations of the above-described Equation (1) to Equation (4). Furthermore, if the visual effect data is 21 to 40%, the first selecting unit 224 selects the pattern data on any one of the corresponding matte effects 1 to 4 (matte 1 pattern to matte 4 pattern) from the first-pattern storage unit 251.

Furthermore, if the visual effect data is 41 to 45%, the first selecting unit 224 selects three sets of pattern data on the corresponding embedded FIG. 1, i.e., the embedded FIG. 1a attern, the embedded FIG. 1b pattern, and the embedded FIG. 1c pattern, from the second-pattern storage unit 252. Similarly, if the visual effect is 46 to 60%, three sets of pattern data are selected from the second-pattern storage unit 252.

If the first selecting unit 224 selects the embedded-figure pattern data from the second-pattern storage unit 252, the second selecting unit 225 selects the embedded-figure pattern data that corresponds to the magnification, calculated by the arrangement-information processing unit 221, from the selected embedded-figure pattern data. Specifically, if the selection information of FIG. 10 is referred to, and if the first selecting unit 224 selects three sets of embedded-figure pattern data from the second-pattern storage unit 252, the second selecting unit 225 selects the embedded-figure pattern data that corresponds to the magnification of the image data, calculated by the arrangement-information processing unit 221, from the selected three sets of embedded-figure pattern data.

Specifically, for example, if the visual effect data is 41 to 45%, the first selecting unit 224 selects three sets of pattern data on the embedded FIG. 1, i.e., the embedded FIG. 1a pattern, the embedded FIG. 1b pattern, and the embedded FIG. 1c pattern. Furthermore, if the magnification of the image data, calculated by the arrangement-information processing unit 221, is equal to or more than 51%, the second selecting unit 225 selects the embedded FIG. 1a pattern, if the magnification is 26% to 50%, selects the embedded FIG. 1b pattern and, if the magnification is equal to or less than 25%, selects the embedded FIG. 1c pattern. Here, the second selecting unit 225 is corresponding to the selecting unit described in Claims.

The transparent-material amount converting unit 226 determines the recording amount of the clear toner in accordance with the selected visual effect. Specifically, if the first selecting unit 224 selects the inverse mask, the transparent-material amount converting unit 226 determines the recording amount of the clear toner by using the above-described Equation (1) to Equation (4). Furthermore, if the first selecting unit 224 selects the matte-effect pattern data from the first-pattern storage unit 251, the transparent-material amount converting unit 226 converts the selected matte-effect pattern data into the transparent-material amount data. Furthermore, if the first selecting unit 224 and the second selecting unit 225 select the embedded-figure pattern data from the second-pattern storage unit 252, the selected embedded-FIG. pattern data is converted into the transparent-material amount data in accordance with the calculated magnification of the image data. Here, the transparent-material amount converting unit is corresponding to the second converting unit described in Claims.

Figure 13:
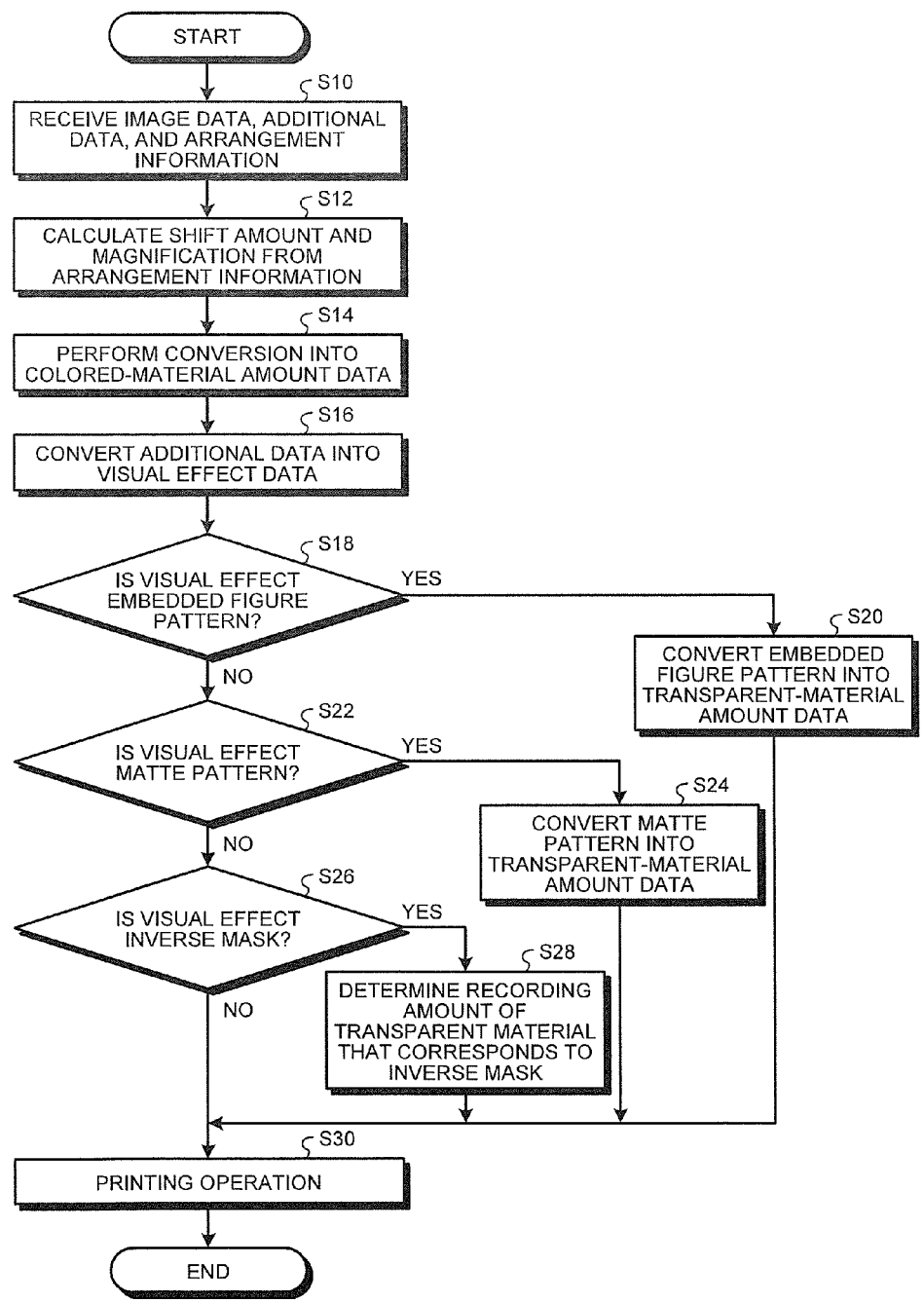
FIG. 13 is a flowchart that illustrates the flow of the printing operation of the image forming apparatus according to the first embodiment.

Next, an explanation is given of a printing operation of the image forming apparatus 1 according to the present embodiment. FIG. 13 is a flowchart that illustrates the flow of the printing operation of the image forming apparatus according to the first embodiment. In the flowchart of FIG. 13, the operation is started when a print command is transmitted to the image forming apparatus 1.

First, the transmitting/receiving unit 202 receives the image data, the additional data, and the arrangement information from an information processing apparatus, such as a PC (Step S10). For example, if the document, generated by using a document preparation software that is activated in the information processing apparatus, such as a PC, is printed by the image forming apparatus 1, it performs communication with the PC to receive the image data, or the like.

On the basis of the received arrangement information, the arrangement-information processing unit 221 calculates the shift amount and the magnification that indicate whether the image data and the additional data are recorded by using the unchanged position/size, how the position or the size is changed, or the like (Step S12).

Next, the colored-material amount converting unit 223 converts the received image data into bitmap-format colored-material amount data, which indicates the recording amount of the colored toner included in the image forming unit 204, in accordance with the magnification that is calculated by the arrangement-information processing unit 221 (Step S14).

The visual-effect converting unit 222 converts the received additional data into bitmap-format visual effect data, indicating the type of visual effect, in accordance with the magnification, or the like, calculated by the arrangement-information processing unit 221 (Step S16).

Next, the transparent-material amount converting unit 226 determines whether the visual effect, indicated by the visual effect data, is an embedded figure pattern (Step S18). If it is an embedded figure pattern (Yes at Step S18), the first selecting unit 224 and the second selecting unit 225 select the embedded figure pattern that corresponds to the visual effect, indicated by the visual effect data, and the magnification, calculated by the arrangement-information processing unit 221, and the transparent-material amount converting unit 226 converts the selected embedded figure pattern into the transparent-material amount data (Step S20) and proceeds to Step S30.

Conversely, if it is not an embedded figure pattern (No at Step S18), the transparent-material amount converting unit 226 determines whether the visual effect, indicated by the visual effect data, is a matte pattern (Step S22). If it is a matte pattern (Yes at Step S22), the first selecting unit 224 selects the matte pattern that corresponds to the visual effect, indicated by the visual effect data, and the transparent-material amount converting unit 226 converts the selected matte pattern into the transparent-material amount data (Step S24) and proceeds to Step S30.

Conversely, if it is not a matte pattern (No at Step S22), the transparent-material amount converting unit 226 determines whether the visual effect, indicated by the visual effect data, is an inverse mask (Step S26). If it is an inverse mask (Yes at Step S26), the transparent-material amount converting unit 226 determines the recording amount of the transparent material that corresponds to the inverse mask by using the above-described Equation (1) to Equation (4) in accordance with the visual effect, indicated by the visual effect data (Step S28).

Furthermore, the operation from Step S18 to Step S28 is conducted on the bitmap-format data, which is converted at Step S14 to Step S16 and, after it is completed, Step S30 is performed. Specifically, the image forming unit 204 performs an operation (printing operation) to form an image on a recording medium on the basis of the converted colored-material amount data and the transparent-material amount data (the determined recording amount of the transparent material in the case of the inverse mask) (Step S30). Furthermore, if it is not an inverse mask (No at Step S26), the image forming unit 204 performs a printing operation on the basis of the converted colored-material amount data (Step S30).

As described above, with the image forming apparatus according to the present embodiment, even if the document data is reduced or enlarged in size and is printed on a recording medium, the pattern data is selected in accordance with the condition, such as the shift amount or the magnification due to reduction or enlargement, and the type of visual effect that is indicated by the additional data, and the selected pattern data is printed by using the clear toner; therefore, even if the document data is reduced or enlarged in size for printing, it is possible to achieve the desired visual surface effect.

Second Embodiment

The image forming apparatus according to the first embodiment is configured to store the embedded-figure pattern data that corresponds to the visual effect and the magnification of the image data to be printed, calculate the magnification of the image data on the basis of the arrangement information, received together with the image data, in the case of application of an embedded figure pattern as a visual effect during printing of the image data, select the embedded-figure pattern data that corresponds to the visual effect and the magnification, and conduct printing by using the clear toner. Conversely, according to the present embodiment, if the embedded-figure pattern data, corresponding to the visual effect, is stored and an embedded figure pattern is applied as a visual effect during printing of the image data, the embedded-figure pattern data that corresponds to the visual effect is selected, the selected pattern data is enlarged/reduced in size in accordance with the magnification of the image data, and printing is conducted by using the clear toner.

The hardware configuration diagram of the image forming apparatus and the hardware configuration diagram of a control unit are the same as those in the first embodiment (see FIGS. 1 and 2).

Figure 14:
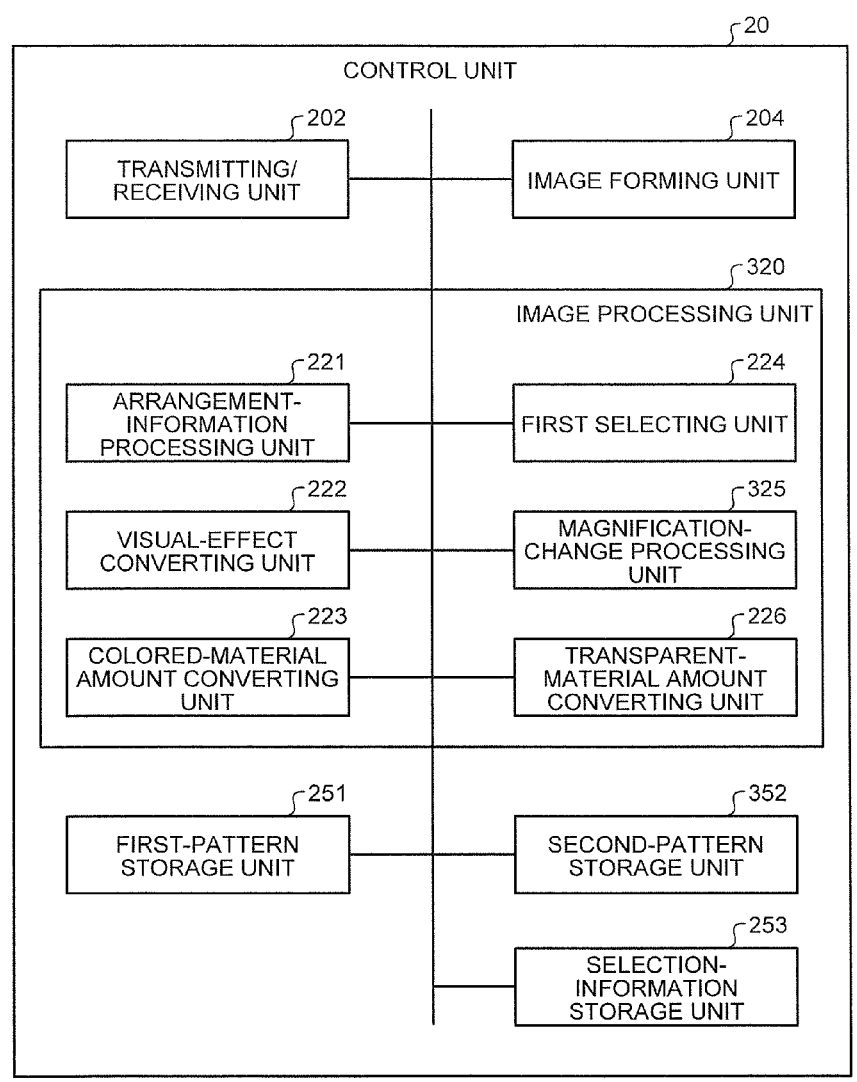
FIG. 14 is a block diagram that illustrates a functional configuration of a control unit according to a second embodiment of the present invention.

An explanation is given of a functional configuration of a control unit 20 of the image forming apparatus 1. FIG. 14 is a block diagram that illustrates the functional configuration of the control unit according to a second embodiment. As illustrated in FIG. 14, the control unit 20 includes the transmitting/receiving unit 202, an image processing unit 320, the image forming unit 204, the first-pattern storage unit 251, a second-pattern storage unit 352, and the selection-information storage unit 253. Here, the transmitting/receiving unit 202, the image forming unit 204, the first-pattern storage unit 251, and the selection-information storage unit 253 are the same as those in the first embodiment and therefore the explanations are omitted. Furthermore, although pattern data in the selection information according to the second embodiment is related to the visual effect and the visual effect data, it is not related to the magnification of the image data.

The second-pattern storage unit 352 is implemented by the HDD 104, or the like, and stores one or more sets of clear-toner embedded-figure pattern data that corresponds to the type of visual effect. Furthermore, the pattern data that corresponds to the visual effect, selected by the first selecting unit 224, is enlarged/reduced in size in accordance with the magnification, calculated by the arrangement-information processing unit 221, and is output to a recording medium.

Figure 15:
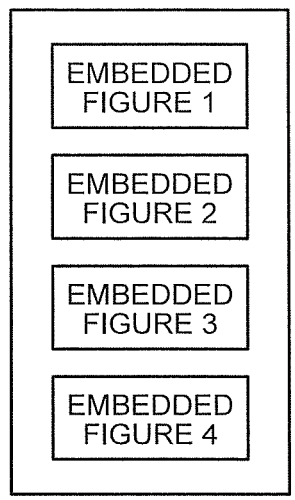
FIG. 15 is an explanatory diagram of a second-pattern storage unit, included in the image forming apparatus according to the second embodiment.

FIG. 15 is an explanatory diagram of the second-pattern storage unit, included in the image forming apparatus according to the second embodiment. As illustrated in FIG. 15, the second-pattern storage unit 352 stores the four types of embedded-figure pattern data, i.e., the embedded figures 1 to 4. Furthermore, any pattern data that corresponds to the selected visual effect (the embedded figures 1 to 4) is selected, and the selected pattern is enlarged/reduced in size in accordance with the magnification and is output to a recording medium.

The image processing unit 320 further includes the arrangement-information processing unit 221, the visual-effect converting unit 222, the colored-material amount converting unit 223, the first selecting unit 224, a magnification-change processing unit 325, and the transparent-material amount converting unit 226. Here, the arrangement-information processing unit 221, the visual-effect converting unit 222, the colored-material amount converting unit 223, the first selecting unit 224, and the transparent-material amount converting unit 226 are the same as those in the first embodiment and therefore the explanations are omitted.

If the first selecting unit 224 selects the embedded-figure pattern data from the second-pattern storage unit 352, the magnification-change processing unit 325 reduces or enlarges the size of the selected embedded-figure pattern data in accordance with the magnification of the image data, calculated by the arrangement-information processing unit 221. Furthermore, the transparent-material amount converting unit 226 converts the reduced or enlarged embedded-figure pattern data into transparent-material amount information.

Next, with reference to FIG. 13, an explanation is given of the part (Step S20), which is different from the operation according to the first embodiment, in the flow of the printing operation by the image forming apparatus 1 according to the second embodiment.

If the visual effect, indicated by the visual effect data, is an embedded figure pattern (Yes at Step S18), the first selecting unit 224 selects the embedded figure pattern that corresponds to the visual effect, indicated by the visual effect data, the magnification-change processing unit 325 enlarges/reduces the size of the selected embedded figure pattern in accordance with the magnification, calculated by the arrangement-information processing unit 221, and the transparent-material amount converting unit 226 converts the enlarged/reduced embedded figure pattern into the transparent-material amount data (Step S20) and proceeds to Step S30.

As described above, with the image forming apparatus according to the present embodiment, even if the document data is reduced or enlarged in size and is printed on a recording medium, the pattern data is selected in accordance with the type of visual effect, indicated by the additional data, and the selected pattern data is reduced or enlarged in size under the condition, such as the shift amount or the magnification due to reduction or enlargement, and is printed by using the clear toner; therefore, even in a case where the document data is reduced or enlarged in size for printing, it is possible to achieve the desired visual surface effect.

Third Embodiment

According to the second embodiment, a configuration is such that the embedded-figure pattern data, which corresponds to the visual effect, is stored and, in the case of application of an embedded figure pattern as a visual effect during printing of the image data, the embedded-figure pattern data corresponding to the visual effect is selected, and the selected pattern data is enlarged/reduced in size in accordance with the magnification of the image data and is printed by using the clear toner. According to the third embodiment, matte or embedded-figure pattern data, which corresponds to a visual effect, is further registered, and the registered pattern data is also used for printing with the clear toner.

The hardware configuration diagram of the image forming apparatus and the hardware configuration diagram of a control unit are the same as those in the first embodiment (see FIGS. 1 and 2).

Figure 16:
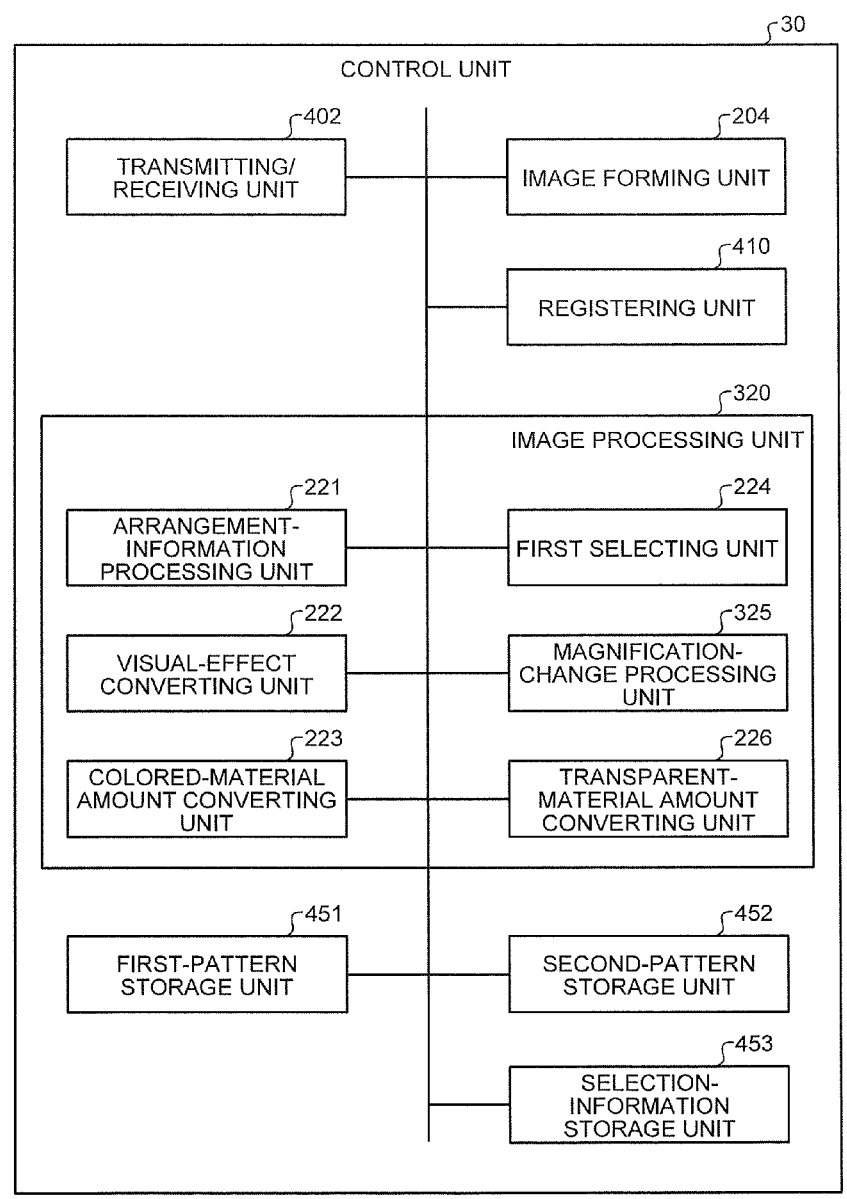
FIG. 16 is a block diagram that illustrates a functional configuration of a control unit according to a third embodiment of the present invention.

An explanation is given of a functional configuration of a control unit 30 of the image forming apparatus 1. FIG. 16 is a block diagram that illustrates the functional configuration of the control unit according to a third embodiment of the present invention. As illustrated in FIG. 16, the control unit 30 includes a transmitting/receiving unit 402, the image processing unit 320, the image forming unit 204, a registering unit 410, a first-pattern storage unit 451, a second-pattern storage unit 452, and a selection-information storage unit 453. Here, the image processing unit 320 and the image forming unit 204 are the same as those in the second embodiment, and the explanations are omitted.

The transmitting/receiving unit 402 is implemented by the network I/F 106, illustrated in FIG. 2, and it transmits and receives data to and from an information processing apparatus, such as a PC. According to the present embodiment, the transmitting/receiving unit 402 receives image data, additional data, and arrangement information, transmitted from the PC, or the like. Moreover, the transmitting/receiving unit 402 further receives the image data on a matte pattern, used as matte pattern data, and the image data on an embedded figure pattern, used as embedded-figure pattern data.

The registering unit 410 registers the image data on the matte pattern, received by the transmitting/receiving unit 402, as matte pattern data in the first-pattern storage unit 451 and registers the received image data on the embedded figure pattern as the embedded-figure pattern data in the second-pattern storage unit 452. Furthermore, if the registered matte pattern and embedded figure pattern correspond to the visual effect data, they may be selected as pattern data by the first selecting unit 224.

Figure 17:
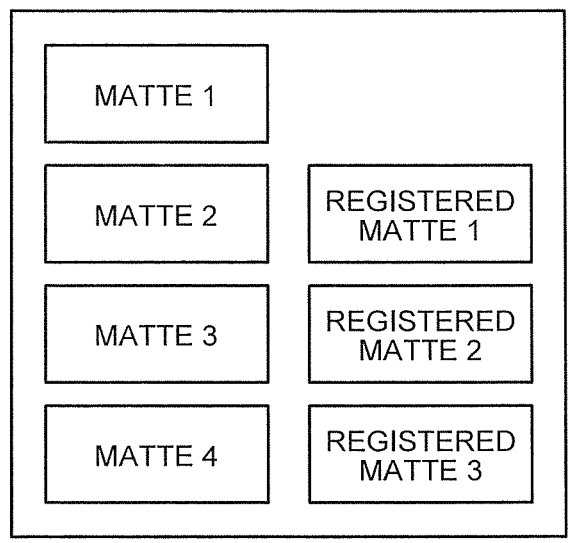
FIG. 17 is an explanatory diagram of a first-pattern storage unit, included in the image forming apparatus according to the third embodiment.

The first-pattern storage unit 451 is implemented by the HDD 104, or the like, and it stores the matte-effect pattern data as is the case with the second embodiment. FIG. 17 is an explanatory diagram of the first-pattern storage unit, included in the image forming apparatus according to the third embodiment. As illustrated in FIG. 17, the first-pattern storage unit 451 stores the matte-effect pattern data on the matte 1 to 4 and the matte-effect pattern data that registers the image data, received from a PC, or the like, on registered matte 1 to 3. Furthermore, the pattern data, which corresponds to the visual effect, selected by the first selecting unit 224, is output to a recording medium.

Figure 18:
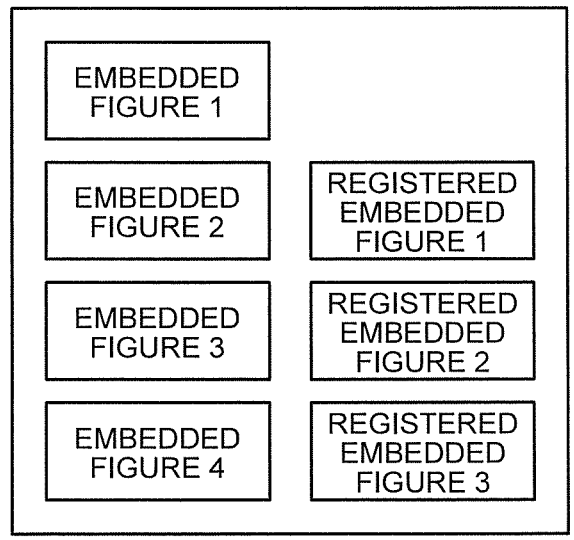
FIG. 18 is an explanatory diagram of the second-pattern storage unit, included in the image forming apparatus according to the third embodiment.

The second-pattern storage unit 452 is implemented by the HDD 104, or the like, and it stores the embedded-figure pattern data as is the case with the second embodiment. FIG. 18 is an explanatory diagram of the second-pattern storage unit, included in the image forming apparatus according to the third embodiment. As illustrated in FIG. 18, the second-pattern storage unit 452 stores the embedded-figure pattern data on the embedded FIGS. 1 to 4 and the embedded-figure pattern data that registers the image data, received from a PC, or the like, on registered embedded FIGS. 1 to 3. Furthermore, the pattern data that corresponds to the visual effect, selected by the first selecting unit 224, is selected, and it is output to a recording medium with the magnification that is changed in accordance with the magnification of the image data.

The selection-information storage unit 453 stores the selection information that is illustrated in FIG. 10; however, here, in order to make it possible to select the patterns of the registered matte 1 to 3 or the patterns of the registered embedded FIGS. 1 to 3 for the visual effect data, for example, a spare area is expanded in the selection information of FIG. 10.

Next, an explanation is given of the flow of a printing operation by the image forming apparatus 1 according to the third embodiment. During the printing operation according to the third embodiment, the patterns of the registered matte 1 to 3 or the patterns of the registered embedded FIGS. 1 to 3 may be selected, and the flow of the operation is the same as that in the second embodiment.

As described above, with the image forming apparatus according to the present embodiment, even if the document data is reduced or enlarged in size and is printed onto a recording medium, the pattern data is selected in accordance with the type of visual effect that is indicated by the additional data, and the selected pattern data is reduced or enlarged in size under the condition, such as the shift amount or the magnification due to reduction or enlargement, and is printed by using the clear toner; therefore, even in a case where the document data is reduced or enlarged in size for printing, it is possible to achieve the desired visual surface effect. Furthermore, the image data, transmitted from an information processing apparatus such as a PC, may be stored as a matte pattern or an embedded figure pattern. Thus, any image data may be used as a matte pattern or an embedded figure pattern. Furthermore, the magnification-change processing unit 325 performs an operation to enlarge/reduce the size of the registered embedded-figure pattern data for printing in accordance with the magnification of the image data; therefore, with regard to the patterns of the registered embedded FIGS. 1 to 3, it is possible to print the pattern data that corresponds to the magnification and the visual effect data.

The program to be executed by the image forming apparatus according to the present embodiments is provided by being previously installed in a ROM, or the like. A configuration may be such that the program to be executed by the image forming apparatus according to the present embodiments is provided by being recorded, in the form of a file that is installable and executable, in a non-transitory computer-readable recording medium, such as a CD-ROM, a flexible disk (FD), a CD-R, or a digital versatile disk (DVD).

Furthermore, a configuration may be such that the program to be executed by the image forming apparatus according to the present embodiments is stored in a computer connected via a network such as the Internet and is provided by being downloaded via the network. Moreover, a configuration may be such that the program to be executed by the image forming apparatus according to the present embodiments is provided or distributed via a network such as the Internet.

The program to be executed by the image forming apparatus according to the present embodiments has a modular configuration that includes the above-described units (the transmitting/receiving unit, the image forming unit, the image processing unit, and the registering unit) and, in terms of actual hardware, the CPU (processor) reads the program from the above-described ROM and executes it so as to load the above-described units into a main storage device so that each of the above-described units is generated in the main storage device. Furthermore, for example, all or some of the functions of the above-described units may be implemented by a dedicated hardware circuit.

Furthermore, the image forming apparatus according to the embodiments of the present invention may be applied to any image forming apparatus that forms images, such as a multifunction peripheral, copier, printer, scanner device, or facsimile machine, which has at least two functions out of a copier function, printer function, scanner function, and facsimile function.

According to the exemplary embodiments of the present invention, there is an advantage such that it is possible to achieve the desired visual surface effect even in a case where an image is recorded on a recording medium after the document data is reduced or enlarged in size.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a storage unit that stores pattern data on a transparent material, which corresponds to a type of visual effect that is applied to a recording medium by using the transparent material;
a receiving unit that receives image data that is output to the recording medium by using colored material, additional data that indicates the type of visual effect, and arrangement information, including information that indicates an area of the image data relative to the recording medium;
an arrangement-information processing unit that refers to the arrangement information to calculate a magnification for output of the image data;
a selecting unit that selects the pattern data that corresponds to the type of visual effect, indicated by the additional data, from the storage unit;
a magnification-change processing unit that reduces or enlarges a size of the selected pattern data in accordance with the calculated magnification;
a first converting unit that converts the image data in accordance with the calculated magnification; and an image forming unit that forms an image on the recording medium by using the converted image data and the reduced-size or enlarged-size pattern data.

2. The image forming apparatus according to claim 1, further comprising a second converting unit that converts the reduced-size or enlarged-size pattern data into transparent-material amount information that indicates a recording amount of the transparent material, wherein
the first converting unit converts the image data into colored-material amount information that indicates a recording amount of colored material in accordance with the calculated magnification, and
the image forming unit forms an image on the recording medium by using the colored-material amount information and the transparent-material amount information that have been converted.

3. The image forming apparatus according to claim 1, wherein the receiving unit further receives pattern image data that is used as the pattern data, the image forming apparatus further comprising a registering unit that registers the received pattern image data as the pattern data in the storage unit.

4. An image forming method that is implemented by an image forming apparatus, the image forming apparatus including a storage unit that stores pattern data on a transparent material, which corresponds to a type of visual effect, applied to a recording medium by using the transparent material, and a magnification for output of image data that is output to the recording medium by using colored material, the image forming method comprising:

receiving the image data, additional data that indicates the type of visual effect, and arrangement information, including information that indicates an area of the image data relative to the recording medium;

referring to the arrangement information to calculate a magnification for output of the image data;

selecting the pattern data that corresponds to the type of visual effect, indicated by the additional data, and the calculated magnification from the storage unit;

converting the image data in accordance with the calculated magnification; and forming an image on the recording medium by using the converted image data and the selected pattern data.

5. A non-transitory computer-readable medium having computer readable program codes, performed by a computer, including a storage unit that stores pattern data on a transparent material, which corresponds to a type of visual effect, applied to a recording medium by using the transparent material, and a magnification for output of image data that is output to the recording medium by using colored material, the program codes when executed causing the computer to execute:

receiving the image data, additional data that indicates the type of visual effect, and arrangement information, including information that indicates an area of the image data relative to the recording medium;

referring to the arrangement information to calculate a magnification for output of the image data;

selecting the pattern data that corresponds to the type of visual effect, indicated by the additional data, and the calculated magnification from the storage unit;

converting the image data in accordance with the calculated magnification; and forming an image on the recording medium by using the converted image data and the selected pattern data.

* * * * *